(12) United States Patent
Hirata et al.

(10) Patent No.: US 8,559,123 B2
(45) Date of Patent: Oct. 15, 2013

(54) MAGNETIC RECORDING DEVICE, MAGNETIC RECORDING METHOD AND MAGNETIC RECORDING MEDIUM FOR SHINGLE WRITE SCHEME

(75) Inventors: Kei Hirata, Tokyo (JP); Norikazu Ota, Tokyo (JP); Noboru Yamanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 684 days.

(21) Appl. No.: 12/801,540

(22) Filed: Jun. 14, 2010

(65) Prior Publication Data
US 2011/0304939 A1 Dec. 15, 2011

(51) Int. Cl.
*G11B 5/09* (2006.01)

(52) U.S. Cl.
USPC .......................................................... 360/48

(58) Field of Classification Search
USPC .................. 360/48, 51, 77.06, 77.12, 125.53, 360/125.65, 125.43, 119.07, 319
See application file for complete search history.

(56) References Cited

U.S. PATENT DOCUMENTS

| | | | |
|---|---|---|---|
| 5,181,149 A * | 1/1993 | Katsumata et al. | 360/119.07 |
| 5,189,572 A * | 2/1993 | Gooch | 360/77.12 |
| 6,185,063 B1 | 2/2001 | Cameron | |
| 6,430,003 B1 * | 8/2002 | Sasaki | 360/125.65 |
| 6,646,828 B1 * | 11/2003 | Sasaki | 360/125.43 |
| 6,738,223 B2 * | 5/2004 | Sato et al. | 360/125.53 |
| 7,019,943 B2 | 3/2006 | Sato | |
| 7,106,549 B2 * | 9/2006 | Asakura | 360/77.06 |
| 7,322,095 B2 | 1/2008 | Guan et al. | |
| 7,342,294 B2 * | 3/2008 | Ouyang et al. | 257/577 |
| 7,394,607 B2 | 7/2008 | Ohno et al. | |
| 7,394,620 B2 | 7/2008 | Taguchi | |
| 7,486,460 B2 | 2/2009 | Tsuchinaga et al. | |
| 7,583,478 B2 * | 9/2009 | Machita et al. | 360/319 |
| 7,675,703 B2 * | 3/2010 | Albrecht et al. | 360/51 |
| 7,848,047 B2 * | 12/2010 | Albrecht | 360/75 |
| 7,894,152 B2 * | 2/2011 | Sato | 360/48 |
| 2010/0033865 A1 | 2/2010 | Hashimoto et al. | |

FOREIGN PATENT DOCUMENTS

| | | |
|---|---|---|
| JP | A-4-17117 | 1/1992 |
| JP | A-2004-22004 | 1/2004 |
| JP | A-2004-326990 | 11/2004 |
| JP | A-2005-310363 | 11/2005 |
| JP | 2006-294162 | 10/2006 |
| JP | A-2007-73138 | 3/2007 |
| JP | A-2008-176862 | 7/2008 |
| JP | A-2009-20929 | 1/2009 |
| JP | A-2010-40113 | 2/2010 |

OTHER PUBLICATIONS

U.S. Appl. No. 12/585,259, filed Sep. 10, 2009, in the name of Yanagisawa et al.

* cited by examiner

*Primary Examiner* — Fred Tzeng
(74) *Attorney, Agent, or Firm* — Oliff & Berridge, PLC

(57) ABSTRACT

This magnetic recording device is provided with a magnetic write head having a magnetic pole, and a magnetic recording medium having a plurality of data recording blocks. Each of the data recording blocks is formed with a plurality of write tracks, and separated, in a write track width direction, from neighboring one of the data recording blocks with a writing exudation suppression section in between. With this configuration, a magnetic mutual interference of the adjacent data recording blocks at the time of a data rewriting process is avoided even when a mutual interval of the data recording blocks is narrowed, and a good recording state is maintained in each of the data recording blocks. Therefore, it is possible to achieve an improvement in a recording density, while realizing the good and brief data rewriting process for each of the data recording blocks.

12 Claims, 11 Drawing Sheets

MAGNETIC RECORDING DEVICE, MAGNETIC RECORDING METHOD AND MAGNETIC RECORDING MEDIUM FOR SHINGLE WRITE SCHEME

BACKGROUND OF THE INVENTION

1. Field of the Invention

This invention relates to a magnetic recording device, a magnetic recording method, and a magnetic recording medium for a shingle write scheme.

2. Description of the Related Art

In recent years, an improvement in performance of a magnetic write head has been demanded, due to an increase in an areal recording density of a magnetic recording medium (hereinafter, referred to as a "recording medium") typified by a hard disk. In response thereto, in substitution for a longitudinal magnetic recording scheme in which a direction of a signal magnetic field is set to an in-plane direction of a recording medium, attention is attracted, as a recording scheme of the magnetic write head, to a perpendicular magnetic recording scheme in which the direction of the signal magnetic field is set to a direction intersecting the plane thereof. The reason is that there are such advantages that a linear recording density improves, and a recording medium on which recording has been already performed is less susceptible to thermal fluctuation.

A magnetic write head of the perpendicular magnetic recording scheme (hereinafter, referred to as a "perpendicular magnetic write head") is provided with a thin-film coil for generating a magnetic flux, and a main magnetic-pole layer for leading the magnetic flux generated in the thin-film coil to a magnetic recording medium. The main magnetic-pole layer includes a tip portion (a magnetic pole) having a fine width, which generates a magnetic field for recording (a recording magnetic field).

As for a configuration of the perpendicular magnetic write head, a provision of a side shield layer on both sides of a magnetic pole in a write-track width direction with a gap inbetween has been under consideration, in order to address a higher recording density while suppressing a spread of the recording magnetic field (for example, see Japanese Unexamined Patent Application Publication No. 2004-326990, No. 2004-022004, and No. 2005-310363).

In these days, there has been a trend of ever increasing demand for further improvement in the areal recording density of the magnetic recording medium. Under such circumstances, a new magnetic recording scheme called a shingle write scheme (Shingle Write scheme) has been proposed (for example, see Japanese Unexamined Patent Application Publication No. 2006-294162, No. 2007-73138, and No. 2010-40113). The shingle write scheme writes a part of a magnetic write track in an overlapped fashion (performs writing of a subsequent magnetic write track in such a manner as to overwrite a part of a region of a previously-written magnetic write track). This allows a width of a magnetic write track obtained eventually to be narrower than a width of a trailing edge of a magnetic pole, thus improving the areal recording density of the magnetic recording medium. However, due to having such a feature, it is physically impossible, except for a final write track, to perform a data rewriting process only on an optional unit recording region. Consequently, a recording process has to be performed on all of the magnetic write tracks including even the magnetic write track which, under normal circumstances, does not need to be rewritten. As a result, the processing time required for the data rewriting process increases as compared with a normal recording scheme. Therefore, a method has been proposed, which shortens the processing time for rewriting by providing a plurality of data recording blocks on a magnetic write track, and performing the data rewriting process on each recording block basis. In this case, the plurality of data recording blocks are arranged so as not to be overlapped one another.

Incidentally, an erase band occurs in regions on both side edges of a magnetic write track, over which a magnetic pole of a magnetic write head has passed and a magnetic data has been recorded (a recording region in which a magnetization direction is disordered), due to a phenomenon referred to as a so-called writing exudation. In particular, a relatively large erase band occurs when an angle of inclination (a skew angle) of a main magnetic pole relative to a tangential direction (a direction of rotation of a magnetic disk, or a direction of movement of the main magnetic pole) of the write track is large. Thus, when providing the plurality of data recording blocks on the magnetic disk, it is necessary to ensure a clearance region to an extent in which they do not interfere mutually at the time of the data rewriting process. However, although errors such as erroneous erasure and erroneous writing of data can be avoided, the ensuring of wide clearance region, as a matter of course, incurs a decrease in the areal recording density of the magnetic recording medium.

In view of such circumstances, a magnetic recording device, a magnetic recording method, and a magnetic recording medium for a shingle write scheme, capable of shortening the processing time without involving a generation of error at the time of data rewriting process, and yet adaptable to high-density recording, are strongly desired.

SUMMARY OF THE INVENTION

A magnetic recording device according to an embodiment of the invention is provided with: a magnetic write head having a magnetic pole; and a magnetic recording medium having a plurality of data recording blocks, each of which is formed with a plurality of write tracks and separated, in a write track width direction, from neighboring one of the data recording blocks with a writing exudation suppression section in between.

A magnetic recording medium for a shingle write scheme according to an embodiment of the invention has: a plurality of data recording blocks, each of which is formed with a plurality of write tracks and separated, in a write track width direction, from neighboring one of the data recording blocks with a writing exudation suppression section in between.

In the magnetic recording device and the magnetic recording medium for the shingle write scheme according to the embodiments of the invention, the plurality of data recording blocks are provided, and they are separated by the writing exudation suppression section. Thus, a magnetic mutual interference of the adjacent data recording blocks at the time of a data rewriting process is avoided even when a mutual interval of the data recording blocks is narrowed, and a good recording state is maintained in each of the data recording blocks. Therefore, it is possible to achieve an improvement in a recording density, while realizing a good and brief data rewriting process for each of the data recording blocks.

A magnetic recording method according to an embodiment of the invention includes: a first step rotating a magnetic recording medium having a plurality of data recording blocks, each of which is formed with a plurality of write tracks and separated, in a write track width direction, from neighboring one of the data recording blocks with a writing exudation suppression section in between; and a second step applying a recording magnetic field from a magnetic pole of a magnetic write head flying over the magnetic recording medium, to perform recording of data on the predetermined data recording blocks. The second step so passes the magnetic pole that the magnetic pole is overlapped with a part of a region in which the recording of the data has been previously performed, and, when performing the recording on a final write track in the data recording block, passes a part of the magnetic pole over the writing exudation suppression section.

In the magnetic recording method according to the embodiment of the invention, the plurality of data recording blocks, separated in a write track width direction from neighboring one of the data recording blocks with the writing exudation suppression section in between, are provided on the magnetic recording medium, and the part of the magnetic pole passes over the writing exudation suppression section when performing the recording on the final write track in each of the data recording blocks. Thus, a magnetic mutual interference of the adjacent data recording blocks is avoided, and a good recording state is maintained in each of the data recording blocks. Therefore, it is possible to achieve an improvement in a recording density, while realizing a good and brief data rewriting process for each of the data recording blocks.

DETAILED DESCRIPTION OF THE PREFERRED EMBODIMENTS

In the following, an embodiment of the invention will be described in detail with reference to drawings.

[Configuration of Magnetic Recording Reproducing Device]

Figure 1:
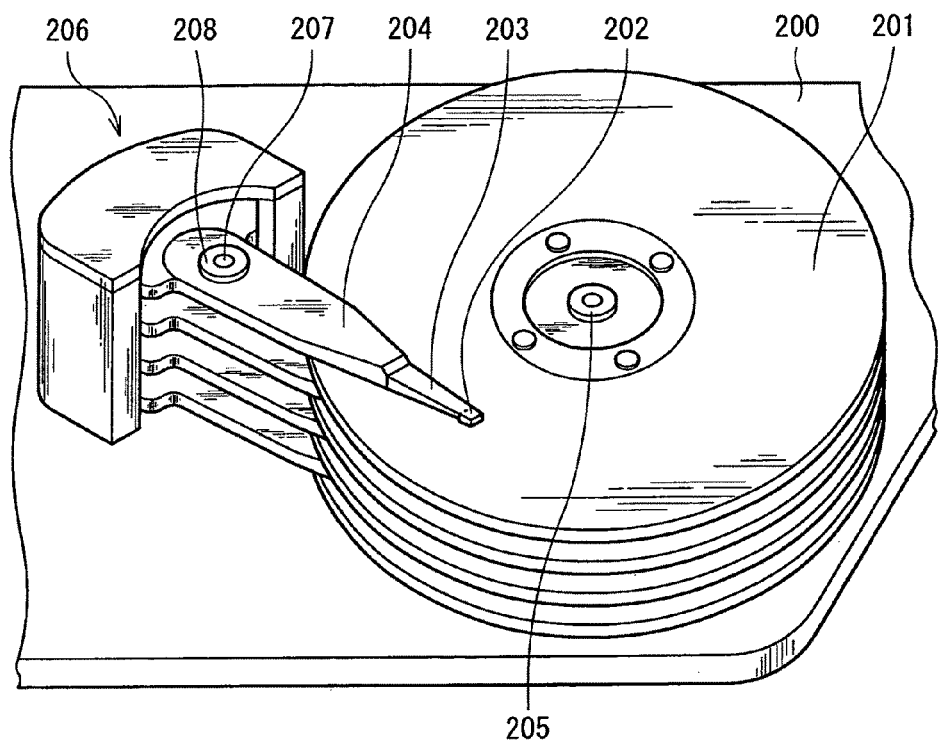
FIG. 1 is a perspective view illustrating a configuration of a magnetic recording reproducing device according to an embodiment of the invention.
Figure 2:
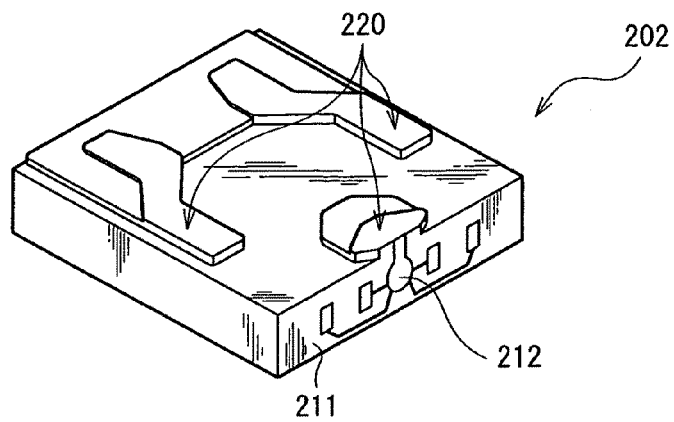
FIG. 2 is a perspective view illustrating a configuration of a main part in FIG. 1 in an enlarged fashion.

First, a configuration of a magnetic recording reproducing device mounted with a thin-film magnetic head will be described. FIG. 1 illustrates a perspective configuration of the magnetic recording reproducing device as a whole. FIG. 2 illustrates a perspective configuration of a main part of the magnetic recording reproducing device.

The magnetic recording reproducing device is a hard disk drive having a shingle write scheme. As illustrated in FIG. 1, the magnetic recording reproducing device includes, in a housing 200, a plurality of magnetic disks (hard disks) 201 as magnetic recording media, a plurality of suspensions 203 each of which is provided corresponding to the respective magnetic disks 201 and supports a magnetic head slider 202 at one end, and a plurality of arms 204 each of which supports the other end of the respective suspensions 203. The magnetic disk 201 is rotatable about a spindle motor 205 fixed to the housing 200. The arm 204 is connected to a drive section 206 serving as a power source, and is pivotable through a bearing 208 about a fixed shaft 207 fixed to the housing 200. The drive section 206 includes a drive source such as a voice coil motor, for example. The magnetic recording device is, for example, a model in which the plurality of arms 204 are integrally pivotable about the fixed shafts 207. Incidentally, for better visualization of the internal configuration of the magnetic recording device, FIG. 1 illustrates the housing 200 with partial cutouts. Also, a detailed configuration of the magnetic disk 201 will be described later.

As illustrated in FIG. 2, the magnetic head slider 202 has a configuration in which a thin-film magnetic head 212, which is the above-described thin-film magnetic head, is attached on one surface of a substrate 211, configured of a nonmagnetic insulating material such as AlTiC ($Al_2O_3.TiC$) and having a substantially rectangular solid structure, for example. On one surface of the substrate 211 (an air bearing surface 220), there is provided a concave-convex structure for reducing an air resistance generated when the arm 204 pivots, and on the other surface thereof which intersects the air bearing surface 220 (a surface on the right front side in FIG. 27), the thin-film magnetic head 212 is attached, for example. The magnetic head slider 202 floats from a recording surface of the magnetic disk 201 (a surface facing the magnetic head slider 202) by utilizing an air flow generated between the recording surface of the magnetic disk 201 and the air bearing surface 220, when the magnetic disk 201 rotates at the time of recording or reproducing information. Incidentally, for better visualization of the structure on the air bearing surface 220 side in the magnetic head slider 202, FIG. 2 illustrates a state which is upside down compared with a state illustrated in FIG. 1.

In the magnetic recording reproducing device, the arm 204 pivots at the time of recording or reproducing the information, whereby the magnetic head slider 202 moves to a predetermined recording region in the magnetic disk 201. Then, when the thin-film magnetic head 212 is energized in a state where it faces the magnetic disk 201, the thin-film magnetic head 212 performs the recording process or the reproducing process on the magnetic disk 201, based on the operational principle described above.

[Configuration of Thin-Film Magnetic Head]

Figures 3A, 3B:
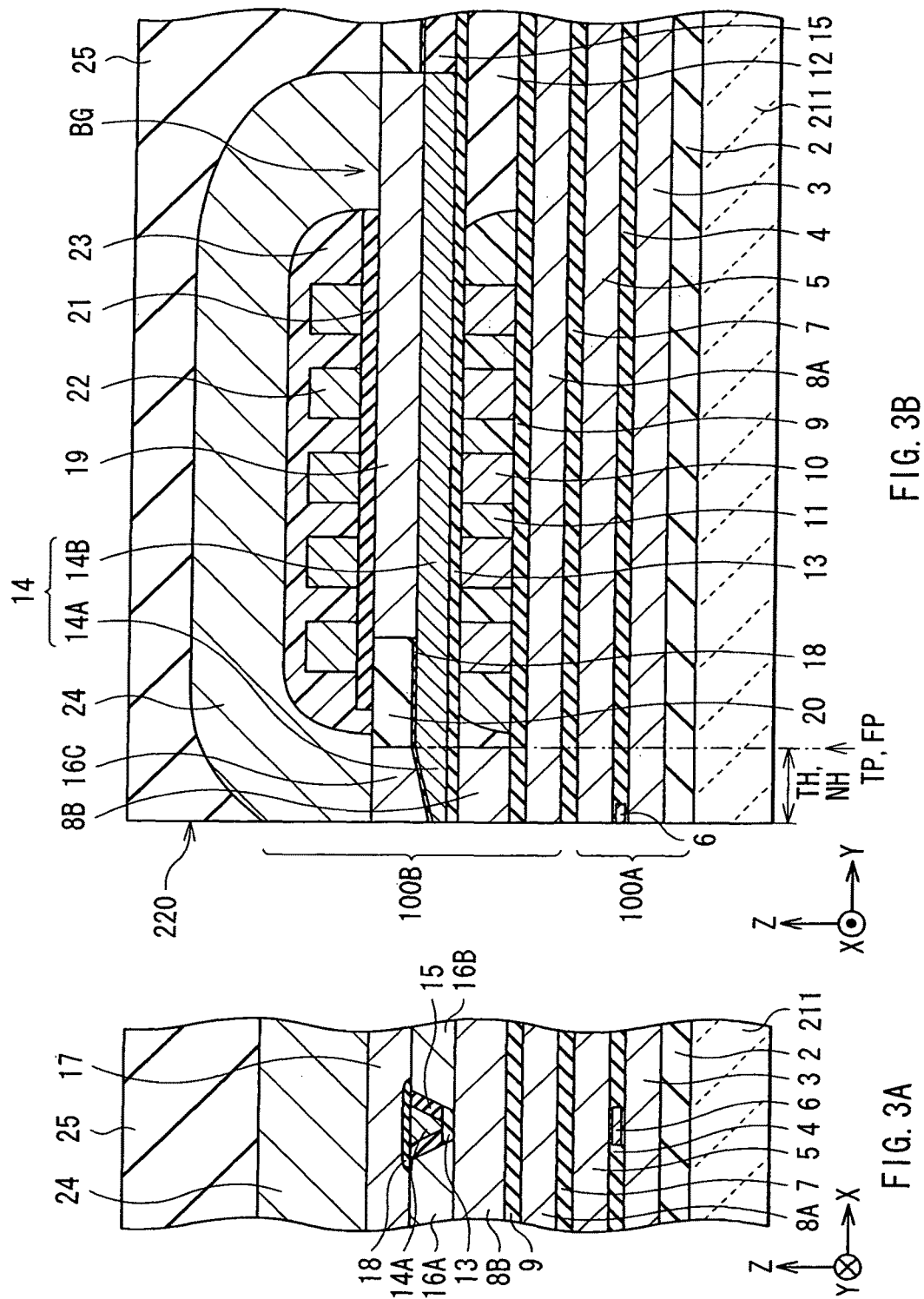
FIG. 3 is a cross-sectional view illustrating a configuration of a thin-film magnetic head illustrated in FIG. 2.
Figure 4:
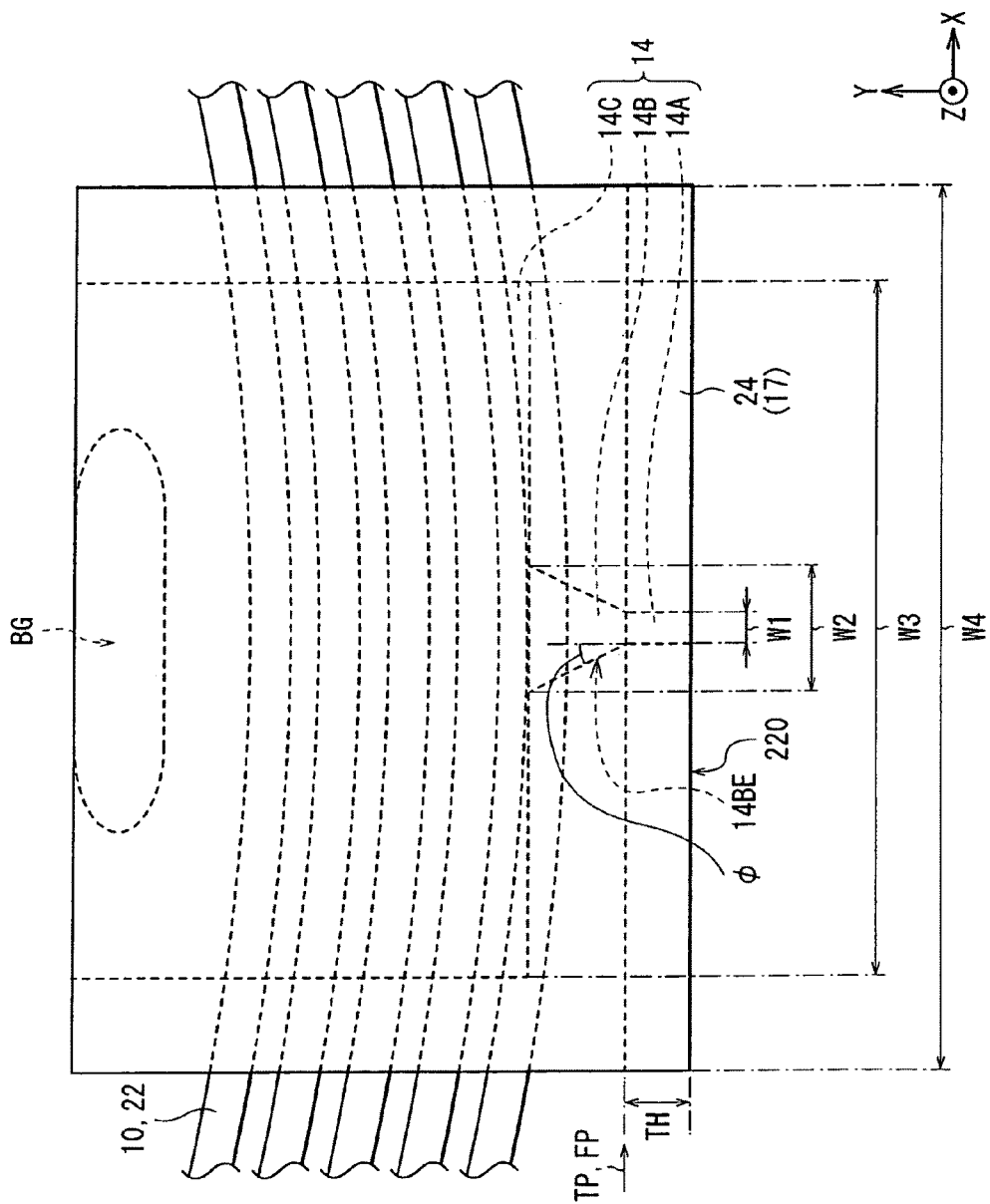
FIG. 4 is a plan view illustrating a configuration of a main part of the thin-film magnetic head illustrated in FIG. 2.
Figure 5:
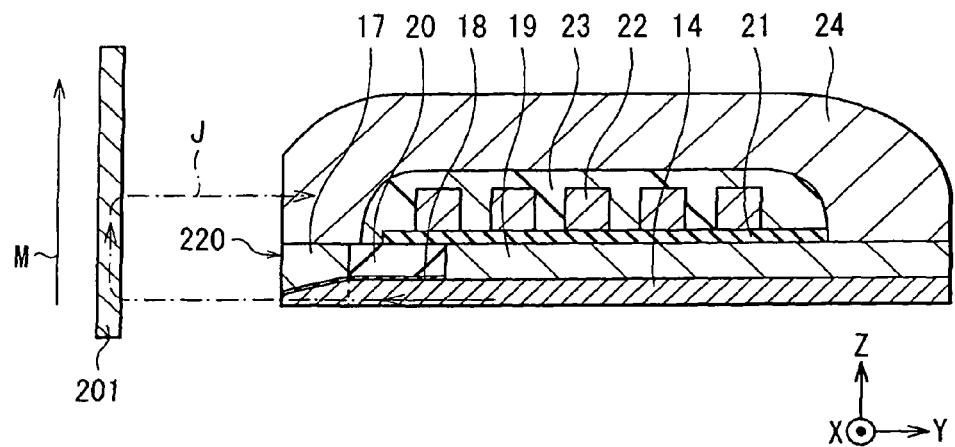
FIG. 5 is a cross-sectional view for describing a relationship between the thin-film magnetic head illustrated in FIG. 2 and a magnetic disk.

FIG. 3 to FIG. 5 illustrates a configuration of the thin-film magnetic head 212 illustrated in FIG. 2. More specifically, FIG. 3 illustrates a cross-sectional configuration thereof as a whole, FIG. 4 illustrates a plan configuration of a main part, and FIG. 5 describes a relationship between the thin-film magnetic head 212 and the magnetic disk 201. FIG. 3A illustrates a cross-section which is parallel to the air bearing surface 220, and FIG. 3B illustrates a cross-section which is perpendicular to the air bearing surface 220. Incidentally, an up-pointing arrow M illustrated in FIG. 3 indicates a direction in which the magnetic disk 201 moves relatively to the thin-film magnetic head 212.

In the following description, dimensions in an X axis direction, a Y axis direction, and a Z axis direction, all of which being indicated in FIGS. 3 to 5, are referred to as "width", "length", and "thickness", respectively. Also, a side close to the air bearing surface 220 in the Y axis direction is referred to as "front", whereas a side away from the air bearing surface 220 in the Y axis direction is referred to as "rear". Further, a side ahead of the direction of the arrow M is referred to as a "trailing side", and a side behind the direction of the arrow M is referred to as a "leading side". These definitions are also applicable to FIG. 6 and Figures subsequent thereto, all of which will be described later.

The thin-film magnetic head 212 performs a magnetic process on the magnetic disk 201, and is a composite head capable of performing both reading process and writing process.

As illustrated in FIG. 3, the thin-film magnetic head 212 has the configuration in which an insulating layer 2, a read head portion 100A, a separating layer 7, a write head portion 100B, and an overcoat layer 25 are stacked in this order on the substrate 211, and has the air bearing surface 220 which is one side face common thereto, for example.

The insulating layer 2, the separating layer 7, and the overcoat layer 25 are configured of a nonmagnetic insulating material such as aluminum oxide, for example. The aluminum oxide includes, for example, alumina ($Al_2O_3$).

The read head portion 100A performs the reproducing process by utilizing a magnetoresistive effect (MR: magnetoresistive effect). The read head portion 100A has, for example, a configuration in which a bottom lead shield 3, a shielding gap 4, and a top lead shield 5 are stacked in this order. In the shielding gap 4, a reproducing element (an MR element 6) is buried such that one end face thereof is exposed on the air bearing surface 220.

The bottom lead shield 3 and the top lead shield 5 magnetically separate the MR element 6 from the periphery thereof, and extend rearward from the air bearing surface 220. The bottom lead shield 3 is configured of, for example, a magnetic material such as a nickel-iron alloy (NiFe). The nickel-iron alloy includes, for example, Permalloy (trade name) in which the content of nickel and that of iron are 80 weight % and 20 weight %, respectively. The top lead shield 5 is configured of, for example, a magnetic material such as Permalloy. Incidentally, the bottom lead shield 3 and the top lead shield 5 may have a single-layer structure, or may have a multi-layer structure in which a nonmagnetic layer (configured of, for example, a nonmagnetic conductive material such as ruthenium (Ru) or a nonmagnetic insulating material such as alumina) is sandwiched by a pair of magnetic layers (made of a magnetic material such as Permalloy), for example.

The shielding gap 4 electrically separates the MR element 6 from the periphery thereof, and is configured of, for example, a nonmagnetic insulating material such as alumina. The MR element 6 utilizes a giant magnetoresistive effect (GMR: giant magneto-resistive effect), a tunneling magnetoresistive effect (TMR: tunneling magneto-resistive effect), or the like.

The write head portion 100B is a perpendicular magnetic write head which performs the recording process of a perpendicular magnetic recording scheme. The write head portion 100B has, for example, a configuration in which a magnetic layer 8A, an insulating layer 9, a thin-film coil 10 buried with insulating layers 11 to 13, a leading shield 8B having an end face exposed on the air bearing surface 220, a main magnetic-pole layer 14, a side gap 15, a pair of side shields 16, a trailing shield 17, a trailing gap 18, an auxiliary magnetic-pole layer 19, an insulating layer 20, a thin-film coil 22 buried with insulating layers 21, 23, and a return yoke layer 24, are stacked in this order on the separating layer 7.

The magnetic layer 8A serves as a return path on the leading side, and is configured of, for example, a magnetic material such as NiFe or CoNiFe. The magnetic layer 8A disperses, to the leading side, a part of a recording magnetic field released from the main magnetic-pole layer 14, thereby achieving a decrease in a WATE (Wide Adjacent Track Erase) effective magnetic field. The WATE effective magnetic field means an effective magnetic field which exerts an influence on adjacent tracks in wider ranges (e.g., a track adjacent by 2 to 10 lanes on the basis of a track to be written).

The thin-film coil 10 mainly generates a magnetic flux for suppressing leakage, in order to suppress unintentional reaching (leakage) of a magnetic flux for recording, generated in the thin-film coil 22, to the read head portion 100A. The thin-film coil 10 is configured of, for example, a highly conductive material such as copper (Cu), and has a structure winding about a back gap BG, as illustrated in FIGS. 3 and 4 (spiral structure). Incidentally, the number of windings (the number of turns) of the thin-film coil 10 is not particularly limited. However, it is preferred that the number of windings be coincident with the number of turns of the thin-film coil 22.

The insulating layers 11 to 13 electrically separate the thin-film coil 10 from the periphery thereof. The insulating layer 11 is configured of, for example, a nonmagnetic insulating material such as a photoresist or spin-on-glass (SOG: Spin On Glass) which exhibits fluidity at the time of heating. The insulating layers 12 and 13 are configured of, for example, a nonmagnetic insulating material such as alumina.

The main magnetic-pole layer 14 accommodates the magnetic flux generated in the thin-film coil 22, and releases the magnetic flux from the air bearing surface 220 to generate the recording magnetic field. The main magnetic-pole layer 14 extends rearward from the air bearing surface 220, and is configured of, for example, a high-saturation magnetic flux density magnetic material such as an iron-based alloy. The iron-based alloy includes, for example, an iron-cobalt alloy (FeCo), an iron-cobalt-nickel alloy (FeCoNi), or the like.

As illustrated in FIG. 4, the main magnetic-pole layer 14 has, for example, a planar shape resembling a paddle (paddle) used when rowing a boat. That is, the main magnetic-pole layer 14 includes, in order from the air bearing surface 220 toward the rear, a tip portion 14A (a first magnetic-pole layer section) having a uniform width W1 (a first width) which defines a write-track width, an intermediate portion 14B (a second magnetic-pole layer section) having a width which gradually widens from the width W1 to a width W2 which is wider than the width W1 (a second width: W2>W1), and a rear end portion 14C (a third magnetic-pole layer section) having a width W3 which is larger than the width W2 (a third width: W3>W2), and has a configuration in which the tip portion 14A, the intermediate portion 14B, and the rear end portion 14C are integrated by being coupled to one another, for example. A position where the width of the main magnetic-pole layer 14 widens from the tip portion 14A to the intermediate portion 14B, i.e., a position where the width of the main magnetic-pole layer 14 starts to widen from the width W1, which defines the write-track width, is a flare point FP, which is one of the important factors for determining recording performance of the thin-film magnetic head. Incidentally, FIGS. 3 and 4 each illustrates a case where a throat height zero position TP coincides with the flare point FP, for example.

The tip portion 14A is a section for releasing the magnetic flux for recording, generated in the thin-film coil 14, substantially toward the magnetic disk 201, and so extends in the Y axis direction as to generally have the uniform width W1.

The intermediate portion 14B is a section for supplying the magnetic flux accommodated in the auxiliary magnetic-pole layer 19 to the tip portion 14A. The width of the intermediate portion 14B gradually widens from the width W1 to the width W2, i.e., the intermediate portion 14B has the width W1 in a coupled part with the tip section 14A, and has the width W2 in a coupled part with the rear end portion 14C. A spread angle of the intermediate portion 14B, i.e., an angle Φ between the extending direction (the Y axis direction) of the tip portion 14A and a side edge 14BE of the intermediate portion 14B, is equal to or more than 30 degrees, and is preferably about 40 degrees to 50 degrees.

The rear end portion 14C is a section for supplying the magnetic flux accommodated in the auxiliary magnetic-pole layer 19 to the tip portion 14A, as with the intermediate portion 14B. The rear end portion 14C so extends in the Y axis direction as to generally have the uniform width W3. In particular, the width W3 of the rear end portion 14C coincides with a width of the auxiliary magnetic-pole layer 19, and is smaller than a width W4 (see FIG. 4) of the trailing shield 17 and the return yoke layer 24 (W3<W4), for example.

The main magnetic-pole layer 14 is surrounded by the insulating layer 9, the side gap (SG) 15, and the trailing gap 18, and is separated from the leading shield 8B, the side shields 16, and the trailing shield 17 with each other.

The side gap 15 magnetically separates the main magnetic-pole layer 14 from the pair of side shields 16 in a width direction (the write-track width direction=the X axis direction) (see FIG. 4 which will be described later). The side gap 15 is provided between the main magnetic-pole layer 14 and the pair of side shields 16, and is adjacent to both sides in the width direction of the main magnetic-pole layer 14 (hereinafter, simply referred to as "both sides"). Incidentally, a thickness of the side gap 15 (gap length of the side gap) is, for example, 0.04 μm to 0.15 μm.

The trailing gap 18 magnetically separates the main magnetic-pole layer 14 from the trailing shield 17 in a thickness direction (a direction which intersects the write-track width direction=the Y axis direction), and is also called a write gap. The trailing gap 18 is provided between the main magnetic-pole layer 14 and the trailing shield 17. Incidentally, the side gap 15 and the trailing gap 18 are configured of, for example, a nonmagnetic material such alumina.

The leading shield 8B, the trailing shield 17, and the side shields 16 mainly absorb the magnetic flux in the vicinity of the air bearing surface 220, and avoid a spread of the magnetic flux. This increases a gradient of the recording magnetic field, and reduces the write-track width, resulting in containing of a magnetic field component in an oblique direction in the recording magnetic field. The leading shield 8B, the trailing shield 17, and the side shields 16 extend rearward from the air bearing surface 220, and end at the flare point FP, for example. This makes the trailing shield 17 and the side shields 16 be adjacent to the insulating layer 20 in the rear, and serve to define a forefront end position (the throat height zero position TP) of the insulating layer 20. The leading shield 8B, the trailing shield 17, and the side shields 16 are configured of, for example, a magnetic material similar to that of the main magnetic-pole layer 14, and has a rectangular planar shape with the uniform width W3 which is larger than the width W2 as illustrated in FIG. 4. The detailed configuration in the vicinity of the main magnetic-pole layer 14 on the air bearing surface 220 will be described later (see FIG. 6).

The auxiliary magnetic layer 19 functions as an auxiliary magnetic flux accommodation section for supplying the magnetic flux to the main magnetic-pole layer 14, and may be configured of, for example, a magnetic material similar to that of the main magnetic-pole layer 14, or a magnetic material different from that thereof. The auxiliary magnetic-pole layer 19 extends rearward from a position recessed from the air bearing surface 220 on the trailing side of the main magnetic-pole layer 14, and is coupled to the main magnetic-pole layer 14. The auxiliary magnetic-pole layer 19 has, for example, a rectangular planar shape having the width W2, as illustrated in FIG. 2.

The insulating layer 20 defines a throat height TH being one of the important factors for determining the recording performance of the thin-film magnetic head, and is provided among the auxiliary magnetic-pole layer 19, the trailing shield 17, and the side shields 16. The forefront end position of the insulating layer 20 is the throat height zero position TP as described above. A distance between the throat height zero position TP and the air bearing surface 220 is the throat height TH. The insulating layer 20 is configured of, for example, a nonmagnetic insulating material such as alumina. Incidentally, FIGS. 3 and 4 illustrates the case where the throat height zero position TP is coincident with the flare point FP.

The thin-film coil 22 generates the magnetic flux for recording. In the thin-film coil 22, a current flows in an opposite direction to the thin-film coil 10, for example. Incidentally, the detailed configuration of the thin-film coil 22 is, for example, similar to that of the thin-film coil 10. Also, a helical coil having a structure in which the helical coil winds around the main magnetic-pole layer 14 and the auxiliary magnetic-pole layer 19 while proceeding in the Y axis direction may be adopted, in place of the thin-film coils 10 and 22 both having the spiral structure in which the thin-film coils 20 and 22 wind in a lamination plane as described above.

The insulating layers 21 and 23 electrically separate the thin-film coil 22 from the periphery thereof, and are coupled to the insulating layer 20. The insulating layer 21 is configured of, for example, a nonmagnetic insulating material which is similar to that of the insulating layers 12 and 13. The insulating layer 23 is configured of, for example, a nonmagnetic insulating material similar to that of the insulating layer 11. The forefront ends of the insulating layers 21 and 23 are, for example, recessed from the forefront end of the insulating layer 20.

The return yoke layer 24 mainly absorbs a magnetic flux which returns from the magnetic disk 201 to the write head portion 100B, so that the magnetic flux circulates therebetween. There is a case where not only the return yoke layer 24 but also the side shields 16 and the trailing shield 17, each serving as a write shield, may serve the circulation function of the magnetic flux. The return yoke layer 24 is located on the trailing side of the side shields 16, the trailing shield 17, and the auxiliary magnetic-pole layer 19, and extends rearward starting at the air bearing surface 220. The return yoke layer 24 is, in its front, coupled to the trailing shield 17, and coupled to the auxiliary magnetic-pole layer 19 in the back gap BG in the rearward thereof. Also, the return yoke layer 24 is configured of, for example, a magnetic material similar to that of the main magnetic-pole layer 14, and has a rectangular planar shape having the width W3, as illustrated in FIG. 4. Incidentally, the return yoke layer 24 may be configured of, for example, a magnetic material different from that of the main magnetic-pole layer 14.

[Configuration of Main Part of Thin-Film Magnetic Head]

Figure 6:
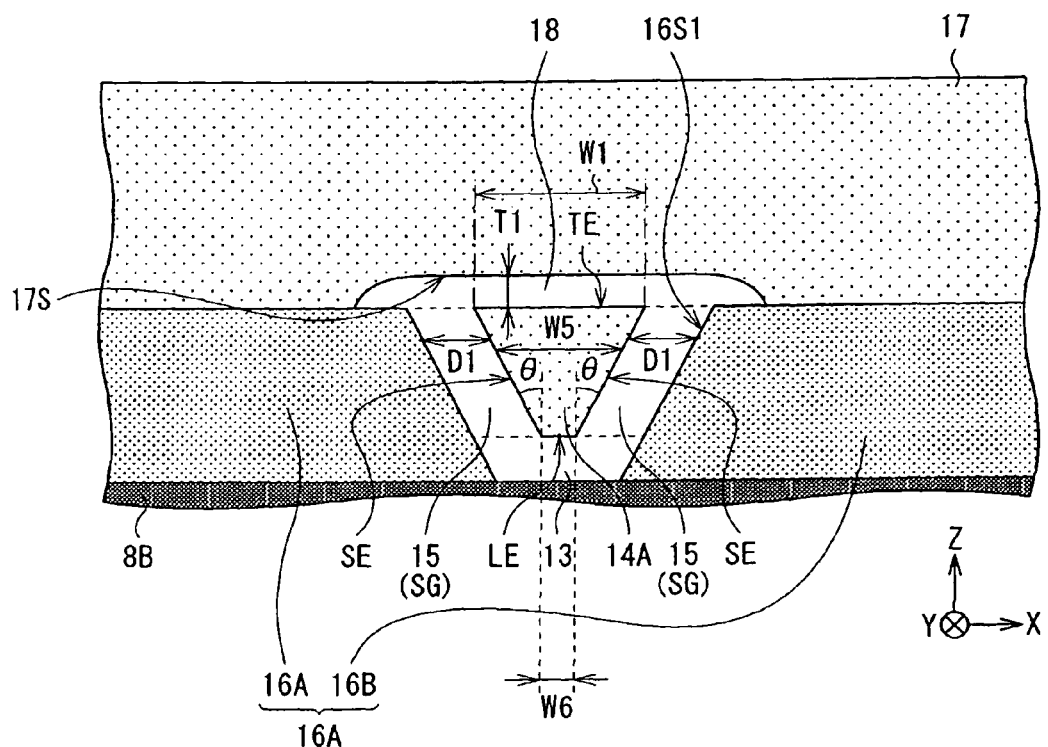
FIG. 6 is an enlarged plan view illustrating a configuration of a main part, in an end face on an air bearing surface, of the thin-film magnetic head illustrated in FIG. 2.

Next, the configuration of the main part of the thin-film magnetic head 212 will be described in detail with reference to FIG. 6. FIG. 6 illustrates a configuration of the end face on the air bearing surface 220 of the main part of the thin-film magnetic head 212. In FIG. 6, for improvement in visibility among the elements, shaded patterns are applied to the respective elements made of a constituent material other than an insulating material.

Each of the leading shield 8B, the insulating layer 13 serving as the leading gap, the tip portion 14A, the side gap 15, the side shields 16, the trailing gap 18, and the trailing shield 17 has its end face which is exposed on the air bearing surface 220. Here, the term "each has its end face which is exposed on the air bearing surface 220" means that the end faces of the above-described elements are included in the air bearing surface 220.

The end face of the tip portion 14A on the air bearing surface 220 has a wider width on the trailing side compared with that on the leading side. More specifically, the end face of the tip portion 14A has an edge located on the trailing side (trailing edge TE), an edge located on the leading side (leading edge LE), and two edges located therebetween (side edges SE). This makes the end face of the tip portion 14A have a shape in which the width W1 of the trailing edge TE is larger than the width W6 of the leading edge LE. The trailing edge TE is substantially a recording place in the tip portion 14A, and the width W1 thereof is, for example, 0.2 μm or less. Incidentally, the side edge SE may have a straight-line shape, may be bent, curved, or may be a mixed form thereof.

In the end face of the tip portion 14A, for example, when comparing the widths W1 and W6 with a width W5 at an arbitrary position between the trailing edge TE and the leading edge LE, relationships of W1>W6 and W1≥W5 are satisfied. In this case, the width W6 may be larger than zero, or may be substantially zero. The case where the width W6 is larger than zero means that the shape of the end face is a shape in which the leading edge LE serves as one side, whereas the case where the width W6 is substantially zero means that the shape of the end face is a shape in which the leading edge LE serves as a top of a corner section.

FIG. 6 illustrates an example in which the shape of the end face of the tip portion 14A is a trapezoid (inverse trapezoid) which includes the trailing edge TE as a top face (long side) and includes the leading edge LE as a bottom face (short side). A bevel angle θ (an angle of inclination of the side edge SE relative to the Z direction) in this case is not particularly limited.

The leading shield 8B, the side shields 16, and the trailing shield 17 surround the tip portion 14A, with the insulating layer 13, the side gap 15, and the trailing gap 18 in between, from four sides of the leading side, the both sides in a cross-track direction (the X axis direction), and the trailing side. Here, the side shields 16 are in contact with the leading shield 8B, while being separated from the trailing shield 17 by the trailing gap 18.

It is desirable that, in a surface 17S facing the tip portion 14A and the side shields 16 in the trailing shield 17, at least a regional part facing the tip portion 14A be planar, since linearity of a shape of a recording bit (a recording bit pattern) obtained at the time of recording is secured, thereby making it easier to obtain higher track density and linear recording density.

Here, a distance D1 of the side gap 15 on the air bearing surface 220 (a distance between the tip portion 14A and the side shields 16 in the width direction) may be uniform, or may be varied in the thickness direction.

The leading shield 8B, the side shields 16, and the trailing shield 17 can be configured with a material such as a nickel-iron alloy (NiFe), a cobalt-nickel-iron alloy (CoNiFe), a cobalt-iron alloy (CoFe), and so forth, for example, and a composition ratio of the alloy is appropriately varied to adjust the saturation magnetic flux density of respective regional parts.

[Configuration of Magnetic Recording Medium]

Figure 7:
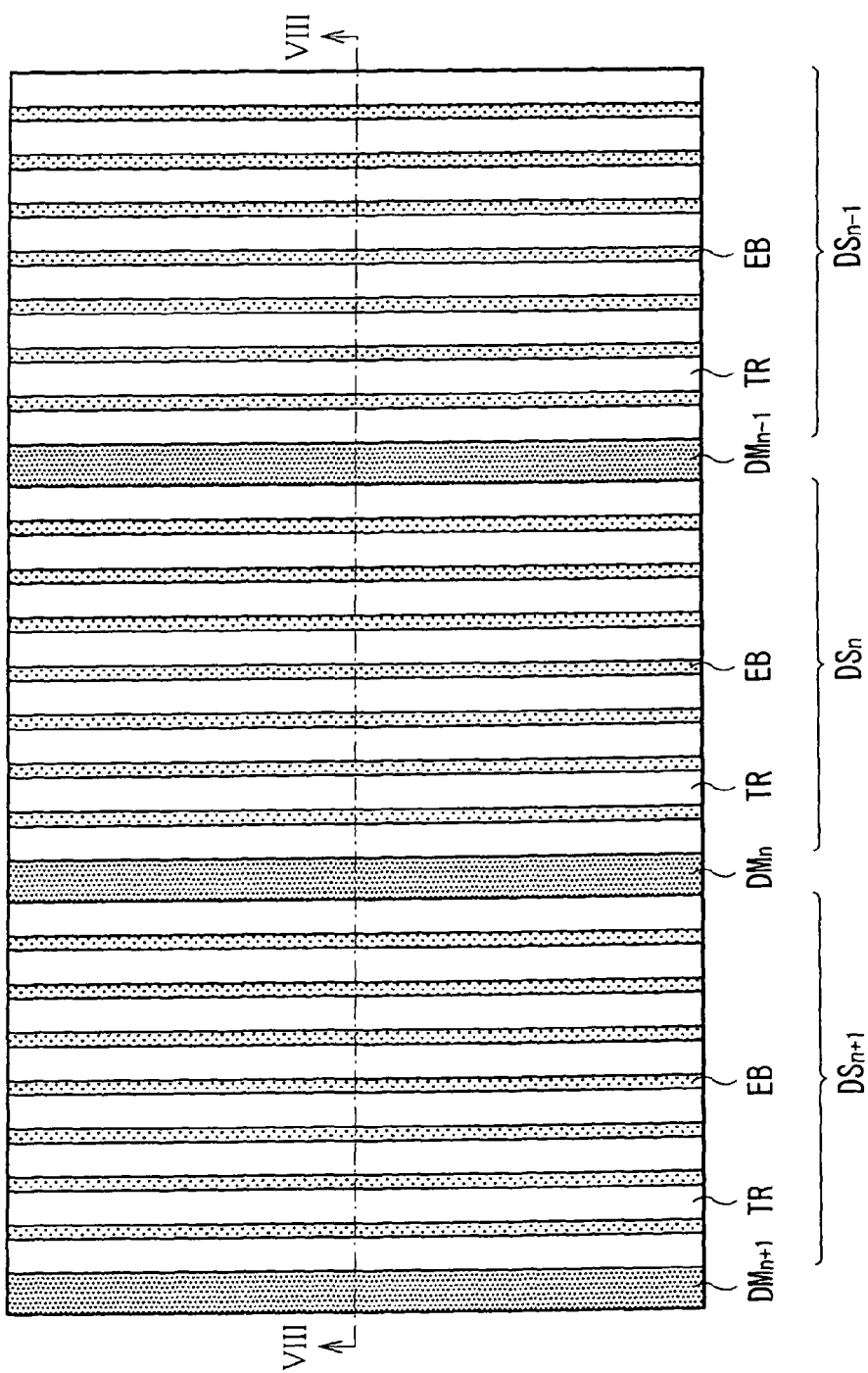
FIG. 7 is a plan view illustrating a configuration of a surface of the magnetic disk in an enlarged fashion.
Figure 8:
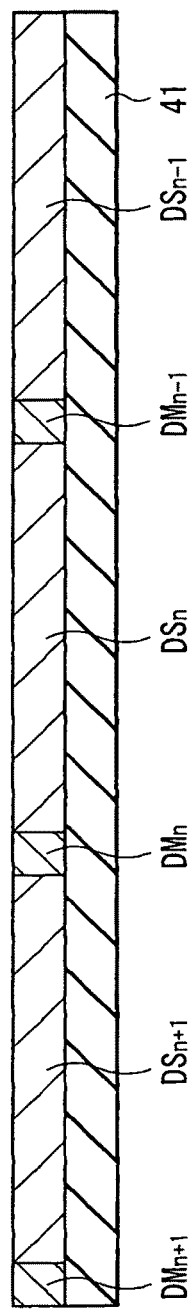
FIG. 8 is a cross-sectional view illustrating a cross-sectional configuration of the magnetic disk in an enlarged fashion.

Next, the specific configuration of the magnetic disk 201 will be described. FIG. 7 illustrates a plan configuration in which a part of a surface of the magnetic disk 201 is enlarged. FIG. 8 illustrates a cross section taken along a line VIII-VIII illustrated in FIG. 7.

Figure 9:
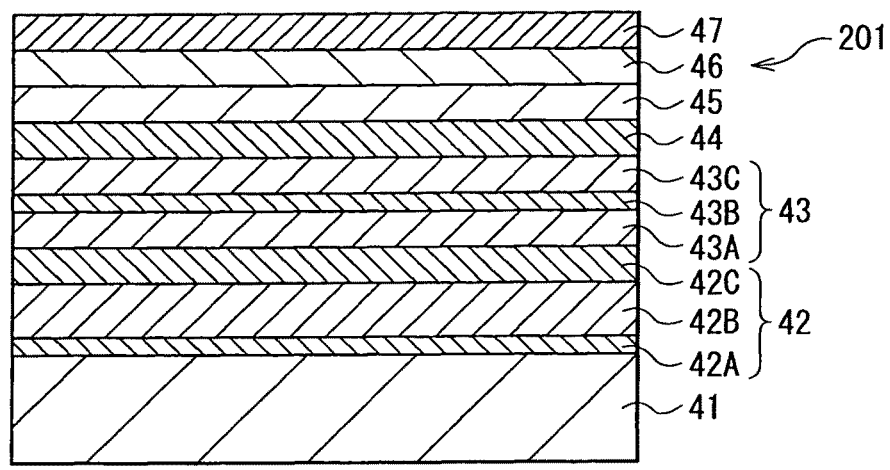
FIG. 9 is a further-enlarged cross-sectional view illustrating a part of FIG. 8.

As illustrated in FIGS. 7 and 8, the magnetic disk 201 has, on a substrate 41, a plurality of data recording blocks DS (..., DSn−1, DSn, DSn+1, ...) separated, in the write-track width direction (the X axis direction), from neighboring one of the data recording blocks DS with a writing exudation suppression layer DM in between. FIG. 9 illustrates a cross section of a part of the data recording block in an enlarged fashion. The data recording block DS of the magnetic disk 201 has a configuration in which a flux path layer 42, a soft magnetic backing layer 43, a nonmagnetic layer 44, a hard magnetic recording layer 45, a protective layer 46, and a lubricating layer 47 are stacked in this order on the substrate 41, for example. The flux path layer 42 functions as a flow path of a magnetic flux in the magnetic disk 201, and has a configuration in which nonmagnetic layers 42A and 42C are so stacked as to sandwich a soft magnetic layer 42B, for example. The soft magnetic backing layer 43 has a configuration in which soft magnetic layers 43A and 43C are so stacked as to sandwich a nonmagnetic layer 43B, for example. The hard magnetic recording layer 45 is subjected to magnetization by the recording magnetic field (information is magnetically recorded).

The substrate 41 is, for example, an aluminum disk plated with nickel-phosphorus (NiP), and a thickness thereof is optional. In the flux path layer 42, for example, the nonmagnetic layer 42A is configured of titanium (Ti: approximately 1 nm in thickness); the soft magnetic layer 42B is configured of a cobalt-nickel-iron alloy (CoNiFe: approximately 100 nm to 200 nm in thickness); and the nonmagnetic layer 42C is configured of nickel-phosphorus (approximately 100 nm in thickness). The flux path layer 42 has permeability higher than that of the soft magnetic backing layer 43, because the magnetic field (recording magnetic field) from the thin-film magnetic head is strongly drawn by the magnetic disk 201, whereby the recording performance improves. It is also because it is located away from the hard magnetic recording layer 45, and accordingly, exerted is less magnetic mutual interaction with the hard magnetic recording layer 45, thereby exhibiting less concern on instability in recording (adjacent track erase or the like). In the soft magnetic backing layer 43, for example, the soft magnetic layer 43A is configured of a boride alloy including iron, cobalt, zirconium, and tantalum (FeCoZrTaB: approximately 50 nm in thickness); the soft magnetic layer 43B is configured of ruthenium (Ru: approximately 0.8 nm in thickness); and the soft magnetic layer 43C is configured of an iron, cobalt, zirconium, and tantalum boride alloy (approximately 50 nm in thickness). The nonmagnetic layer 44 is configured of, for example, a mixture (approximately 30 nm in thickness) of an alloy of ruthenium and chrome (RuCr) and silicon oxide ($SiO_2$). The hard magnetic recording layer 45 is configured of, for example, a mixture (approximately 25 nm in thickness) of an alloy of cobalt, platinum, and chrome (CoPtCr), and silicon oxide ($SiO_2$). The protective layer 46 is configured of, for example, carbon (approximately 2 nm in thickness). However, the cross-sectional configuration of the magnetic disk 201 is not necessarily limited to the configuration described above.

The writing exudation suppression layer DM is made of a ferromagnetic material having a coercivity which is larger than that of the hard magnetic recording layer 45, or made of a nonmagnetic material, and is a section which will not be magnetized by the recording magnetic field. Examples of the ferromagnetic material structuring the writing exudation suppression layer DM include CoPt, CoCrPt, FePt, $CoPt.SiO_2$, $CoCrPt.SiO_2$, and $FePt.SiO_2$. Also, examples of the nonmagnetic material include: a material non-magnetized by ion-implanting the ferromagnetic material described above with other element such as silicon (Si), indium (In), Boron (B), phosphorus (P), carbon (C), and fluorine (F); carbon (C); and an oxide material such as $SiO_2$, $Al_2O_3$, $TiO_2$, and $Ti_2O_3$. Each of the data recording blocks DS is formed with a plurality of write tracks TR. The write track TR is formed along a locus of the main magnetic-pole layer 14 (the tip portion 14A), which passes over the surface of the magnetic disk 201 while releasing the recording magnetic field at the time of the recording process by the magnetic recording reproducing device. Incidentally, a region in which a disorder of magnetization direction is large (a region in which a variation of the magnetization direction is large), referred to as an erase band EB, is formed between the mutual write tracks TR. The erase band EB is formed correspondingly to a region over which the both sides in the width direction of the main magnetic-pole layer 14 have passed in the recording operation. The variation of the magnetization in the erase band EB is large and lacks in reliability, and thus it is normally not used as data.

The magnetic disk 201 is a magnetic recording medium for a shingle write scheme. A width $W_{TR}$ of each of the write tracks TR is narrower than the width W1 of the trailing edge TE of the tip portion 14A (for example, $W_{TR}=0.5\times W1$).

[Operation of Thin-Film Magnetic Head]

The thin-film magnetic head operates as follows.

When recording data on the magnetic disk 201, first, the spindle motor 205 is driven to rotate the magnetic disk 201 (first step). Thereby, the magnetic head slider 202 flies over the surface of the magnetic disk 201. On the other hand, a current is caused to flow from an unillustrated external circuit to the thin-film coil 22 in the write head portion 100B, to generate a magnetic flux J for recording (see FIG. 5). The magnetic flux J is accommodated in the main magnetic-pole layer 14 and the auxiliary magnetic-pole layer 19, and thereafter, flows inside the main magnetic-pole layer 14 toward the tip portion 14A. At this time, the magnetic flux J is narrowed at the flare point FP, so that the magnetic flux J is eventually focused on the vicinity of the trailing edge TE. When the magnetic flux J is released outside to generate the recording magnetic field, the hard magnetic recording layer 45 in the region to which the recording magnetic field is applied is magnetized, by which the data is magnetically recorded in the magnetic disk 201 (second step).

In the thin-film magnetic head, the currents flow in the thin-film coils 10 and 22 in the directions opposite to one another, so that the magnetic fluxes are generated therein in the directions opposite to one another. More specifically, the magnetic flux for recording is generated toward the leading side in the thin-film coil 22, whereas the magnetic flux for suppressing leakage is generated toward the trailing side in the thin-film coil 10. This makes the magnetic flux for recording less likely to be leaked to the read head portion 100A, so that a decrease in detection accuracy in the MR element 6 is suppressed. Also, unintentional erasure of information recorded on the magnetic disk 201 caused by an unnecessary magnetic field, generated due to absorption of the magnetic flux for recording in the bottom lead shield 3 and the top lead shield 5, is suppressed.

Further, when the magnetic flux J is released from the tip portion 14A, a part of the magnetic flux J (a spread component) is absorbed in the trailing shield 17, the side shields 16, and the leading shield 8B, so that the spread of the recording magnetic field is suppressed, and the gradient of that recording magnetic field increases. The magnetic flux J absorbed in the trailing shield 17 and the side shields 16A and 16B is resupplied to the main magnetic-pole layer 14 through the return yoke layer 24.

Incidentally, the magnetic flux J released from the main magnetic-pole layer 14 toward the magnetic disk 201 magnetizes the hard magnetic recording layer 45, and then returns to the return yoke layer 24 through the flux path layer 42, and is resupplied to the main magnetic-pole layer 14. This makes the magnetic flux J be circulated between the write head portion 100B and the magnetic disk 201, whereby a magnetic circuit is established.

Figure 10:
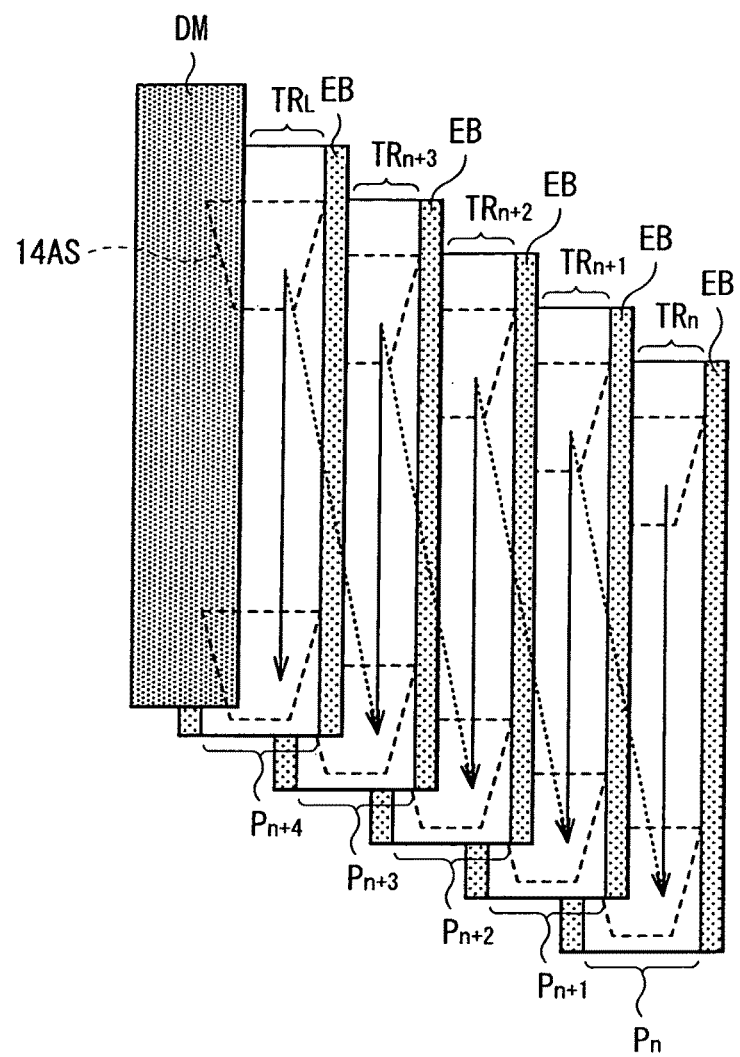
FIG. 10 is a concept illustration for describing a magnetic recording method utilizing the magnetic recording reproducing device of FIG. 1.

The magnetic recording reproducing device employs the shingle write scheme, and so passes the main magnetic-pole layer 14, in the second step described above, that the main magnetic-pole layer 14 is overlapped with a part of a region in which recording of data has been previously performed. When performing recording on the final write track TR in the data recording block, a part of the main magnetic-pole layer 14 is caused to pass over the writing exudation suppression layer DM. For example, as illustrated in FIG. 10, a subsequent passage region Pn+1 is so formed as to overlap with a part of a passage region Pn, over which the tip portion 14A has previously passed and the magnetic recording has been done, on the surface of the magnetic disk 201. That is, the recording operation is so performed that the part of the previous passage region Pn is replaced (overwritten) by the subsequent passage region Pn+1. Thus, a section equivalent to the region, over which a vicinity part of the edges of the tip portion 14A passes and excluding the erase band EB, in a section corresponding to a gap between the previous passage region Pn and the subsequent passage region Pn+1, becomes a finally-obtained write track TRn. Incidentally, a reference numeral 14AS in FIG. 10 denotes a projection of the tip portion 14A projected on the surface of the magnetic disk 201.

Meanwhile, when reproducing data, a sense current is supplied to the MR element 6 in the read head portion 100A. A resistance value of the MR element 6 changes in response to a signal magnetic field for reproducing in the magnetic disk 201. This resistance change is detected as a voltage change, so that the information recorded in the magnetic disk 201 is reproduced magnetically.

[Effect and Result of Magnetic Recording Reproducing Device]

In the magnetic recording reproducing device, it is divided into the plurality of data recording blocks DS each including the plurality of write tracks TR in the magnetic disk 201. This enables a data rewriting process to be performed for each of the data recording blocks DS. Thus, it is possible to significantly shorten the time required for the data rewriting process as compared with a case of having only one data recording block.

Further, the writing exudation suppression layer DM is provided between each of the plurality of data recording blocks DS in the write-track width direction (the X axis direction). Thus, it is possible to suppress the generation of the erase band EB between the mutual data recording blocks DS, and to reduce a mutual interval of the data recording blocks DS.

Figure 11:
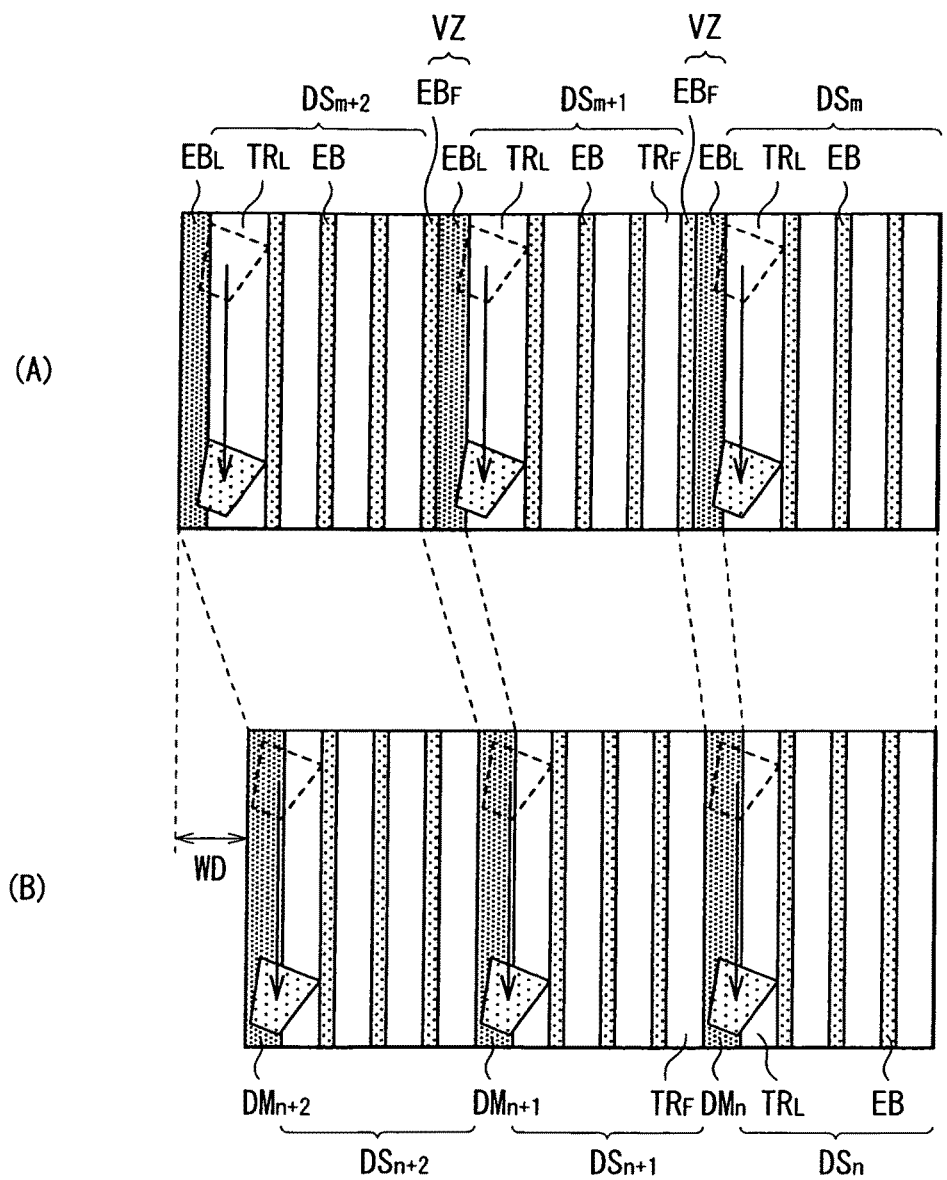
FIG. 11A is a plan view for describing effects in a magnetic disk as a comparative example.
FIG. 11B is a plan view for describing effects in the magnetic disk in the embodiment.

More specifically, in a case where the writing exudation suppression layer DM is not provided as in a comparative example illustrated in FIG. 11(A) for example, an erase band $EB_L$ is formed inevitably on the outer side of a final write track $TR_L$ in a data recording block $DS_m$, to which a data rewriting process has been implemented. A width of the erase band $EB_L$ also increases (with increasing skew angle) in accordance with a skew angle. Also, an erase band $EB_F$ of a first write track $TR_F$ in an adjacent data recording block $DS_{m+1}$ is formed to be adjacent to the erase band $EB_L$ in the data recording block $DS_m$. This forms a gap region VZ between the data recording block $DS_m$ and the data recording block $DS_{m+1}$. Here, in order to allow data recorded in the first write track $TR_F$ in the data recording block $DS_{m+1}$ not to be affected by a magnetic influence of the erase band $EB_L$ (in order that a disorder of magnetization direction may not be distributed) in later performing the rewriting process on the data recording block $DS_m$, a width of the gap region VZ has to be secured sufficiently large. Also, in the comparative example of FIG. 11(A), a width of a final write track $TR_L$ becomes larger than widths of other write tracks TR. These factors will reduce a recording density in the magnetic disk 201 as a whole.

Therefore, in this embodiment, a part of the final write track $TR_L$ and the gap region VZ (the erase bands $EB_L$ and $EB_F$) in FIG. 11(A) are replaced by the writing exudation suppression layer DM, as illustrated in FIG. 11(B). Thus, in FIG. 11(B), the width of the write track $TR_L$ is narrowed. In addition thereto, since magnetic information is not recorded in the writing exudation suppression layer DM (not subjected to magnetization), the erase bands $EB_L$ and $EB_F$ are not formed in FIG. 11(B), and thus a width of the writing exudation suppression layer DM becomes smaller than a total width of the erase band $EB_L$ and the erase band $EB_F$. From these results, it is possible to shorten an arrangement pitch of the data recording blocks DS. Therefore, in this embodiment, an overall width of the three adjacent data recording blocks $DS_n$, $DS_{n+1}$, and $DS_{n+2}$ illustrated in FIG. 11(B) becomes smaller than an overall width of the three data recording blocks $DS_m$, $DS_{m+1}$, and $DS_{m+2}$ of the comparative example illustrated in FIG. 11(A) by a width WD, for example. Incidentally, in the embodiment of FIG. 11(B), the narrowing can be achieved by about 30 to 40 nm (comparable to the width of erase band $EB_F$) per one data recording block DS when the skew angle is 14 degrees for example, as compared with the comparative example of FIG. 11(A). Therefore, by providing the writing exudation suppression layer DM, a magnetic mutual interference of the adjacent data recording blocks DS at the time of the data rewriting process is avoided even when the mutual interval of the data recording blocks DS is narrowed, and a good recording state is maintained in each of the data recording blocks DS.

Figure 12:
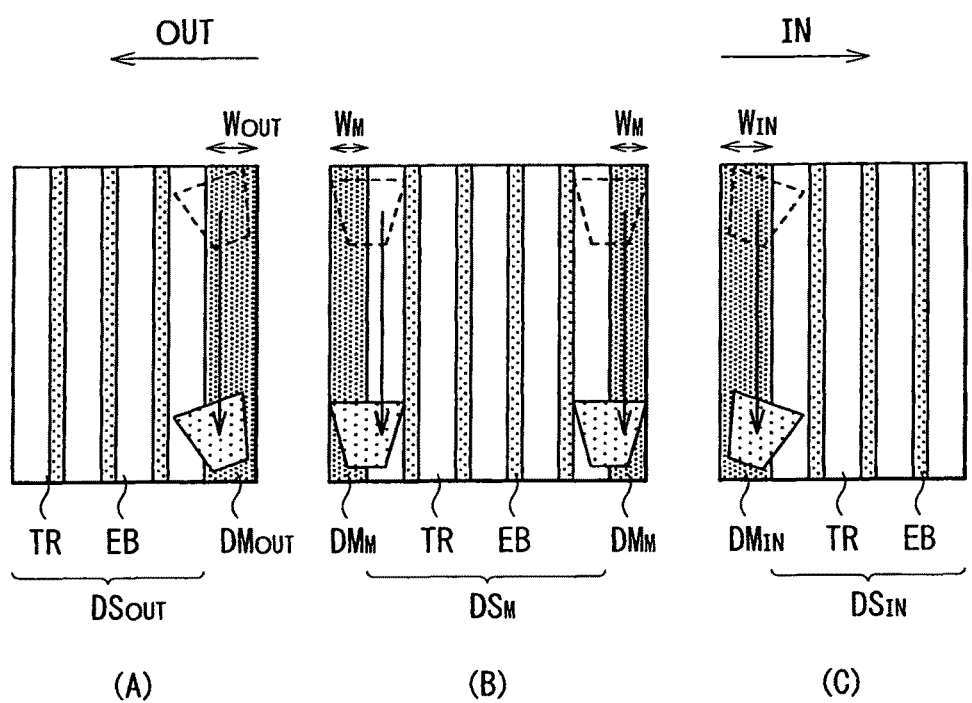
FIG. 12 is another plan view illustrating the surface configuration in the magnetic disk of the embodiment in an enlarged fashion.

Incidentally, as illustrated in FIG. 12, a width $W_{DM}$ of the writing exudation suppression layer DM differs depending on a position in the magnetic disk 201. This is for, since an angle of inclination (a so-called skew angle) of the main magnetic-pole layer 14 in a reference direction (the Z axis direction) relative to a tangent line of the write track TR for example differs mutually among a region on an inner circumferential side in a radial direction of the magnetic disk 201, an intermediate region thereof, and a region on an outer circumferential side thereof due to a structural reason of the magnetic recording reproducing device, adapting the width $W_{DM}$ to the differences in the angle of inclination. For example, in FIGS. 12, (A), (B), and (C) illustrate a data recording block $DS_{OUT}$ in the outer circumferential region in the radial direction of the magnetic disk 201, a data recording block $DS_{TM}$ in the intermediate region, and a data recording block $DS_{IN}$ in the inner circumferential region, respectively. Incidentally, FIG. 12 illustrates an exemplary case where the skew angle is so set that the skew angle is the minimum (zero degrees) in the intermediate region of the magnetic disk 201, and so set that (an absolute value of) the skew angle becomes larger as going toward the inner circumferential side or toward the outer circumferential side. Herein, a width $W_{EB}$ of the erase band $EB_L$ (see FIG. 11(A)) in a case of not providing the writing exudation suppression layer DM increases more as the skew angle increases. For example, the width $W_{EB}$ is about 0.01 to 0.015 μm when the skew angle is zero degrees, whereas it increases up to about 0.02 to 0.04 μm when the skew angle is 14 degrees. Thus, in order to address this, the widths $W_{IN}$ and $W_{OUT}$ of the writing exudation suppression layers DM in the regions on the inner circumferential side and the outer circumferential side are made larger than the width $W_M$ of the writing exudation suppression layer DM in the intermediate region, respectively. That is, the width $W_{DM}$ of the writing exudation suppression layer DM is the maximum in an innermost circumferential part or in an outermost circumferential part of the magnetic disk 201.

For these reasons, the shortening of the arrangement pitch of the data recording blocks DS is achieved particularly effectively in a region on the magnetic disk 201 in which the skew angle is large.

As described in the foregoing, in this embodiment, the plurality of data recording blocks DS are provided in the magnetic disk, and those are separated by the writing exudation suppression layer DM. Therefore, it is possible to improve a recording density, and to perform a good and brief data rewriting process for each of the data recording blocks DS.

Figure 13:
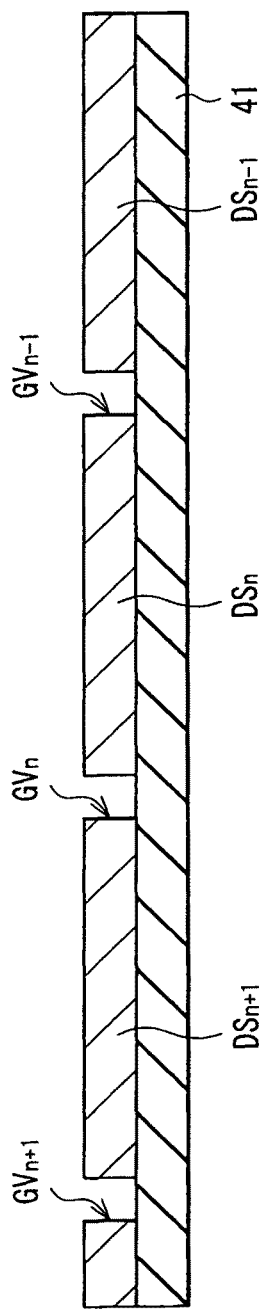
FIG. 13 is a cross-sectional view illustrating a cross-sectional configuration in a magnetic disk as a modification.

Incidentally, the invention is not limited to the embodiment described above, and various modifications are possible. Specifically, in the embodiment described above, although the writing exudation suppression layer, as the section which will not be magnetized by the recording magnetic field, is provided between the mutual data recording blocks in the surface of the magnetic disk, the invention is not limited thereto, for example. That is, for example, a groove (a recess) GV may be provided between the mutual data recording blocks instead of the above-described writing exudation suppression layer, as illustrated in FIG. 13. In this case, the groove GV functions as the section which will not be magnetized by the recording magnetic field (the writing exudation suppression layer).

Correspondence relationships between the reference numerals and the elements in this embodiment are represented collectively as follows.

1 . . . substrate
2, 9, 11 to 13, 20, 21, and 23 . . . insulating layer
3 . . . bottom lead shield
4 . . . shielding gap
5 . . . top lead shield
6 . . . magnetoresistive effect (MR) element
7 . . . separating layer
8A and 8C . . . magnetic layer
8B . . . leading shield
10 and 22 . . . thin-film coil
14 . . . main magnetic-pole layer
14A . . . tip portion
14B . . . rear end portion
15 . . . side gap (SG)
16 . . . side shield
17 . . . trailing shield
18 . . . trailing gap
19 . . . auxiliary magnetic-pole layer
24 . . . return yoke layer 25 ... overcoat layer
220 ... air bearing surface
100A ... read head portion
100B ... write head portion
200 ... housing
201 ... magnetic disk
202 ... magnetic head slider
203 ... suspension
204 ... arm
205 ... spindle motor
206 ... drive section
207 ... fixed shaft
208 ... bearing
211 ... substrate
212 ... thin-film magnetic head
220 ... air bearing surface
DM ... writing exudation suppression layer
DS ... data recording block
TR ... write track
EB ... erase band.

What is claimed is:

1. A magnetic recording device, comprising:
a magnetic write head having a magnetic pole; and
a magnetic recording medium configured for a shingle write scheme, the magnetic recording medium having a plurality of data recording blocks, each of which is formed with a plurality of write tracks and separated, in a write track width direction, from neighboring one of the data recording blocks with a writing exudation suppression section in between.

2. The magnetic recording device according to claim 1, wherein the writing exudation suppression section is made of a ferromagnetic material having a coercivity which is larger than that of the data recording blocks, or made of a nonmagnetic material.

3. The magnetic recording device according to claim 1, wherein a width, in a write track width direction, of the writing exudation suppression section in the magnetic recording medium is varied depending on a position, in a write track width direction, on the magnetic recording medium.

4. The magnetic recording device according to claim 1, wherein a width, in a write track width direction, of the writing exudation suppression section in the magnetic recording medium has a distribution, in magnitude, corresponding to a skew angle, which is defined as an inclination angle between a reference direction in the magnetic pole and a tangent line of the write track.

5. The magnetic recording device according to claim 1, wherein the write tracks and the writing exudation suppression section are concentrically formed, and
the writing exudation suppression section has a maximum width in an innermost circumferential part or in an outermost circumferential part in the magnetic recording medium.

6. The magnetic recording device according to claim 1, wherein a width of the write track is narrower than a width of the magnetic pole on a trailing-edge side.

7. The magnetic recording device according to claim 1, wherein a process of rewriting data on the write tracks in any one of the data recording blocks is performed as a unit process.

8. The magnetic recording device according to claim 1, wherein the writing exudation suppression section is so arranged that one or both sides thereof in a track width direction are in contact with the write track.

9. A magnetic recording method, comprising steps of:
rotating a magnetic recording medium configured for a shingle write scheme, the magnetic recording medium having a plurality of data recording blocks, each of which is formed with a plurality of write tracks and separated, in a write track width direction, from neighboring one of the data recording blocks with a writing exudation suppression section in between; and
applying a recording magnetic field from a magnetic pole of a magnetic write head flying over the magnetic recording medium to the magnetic recording medium, so that a process of writing data onto the write tracks one after another in a desired one of the data recording blocks is perform as a unit, while allowing the magnetic write head to move across the write tracks in a one-way travel along the write track width direction, the magnetic pole being aligned to overlap a part of an immediate recorded region, thereby to perform a data-overwriting on the part of the immediate recorded region, and the magnetic pole being aligned to overlap a part of the writing exudation suppression section, when performing a writing on a final write track in the desired data recording block.

10. The magnetic recording method according to claim 9, wherein a ferromagnetic material having a coercivity which is larger than that of the data recording blocks, or made of a nonmagnetic material, is used for the writing exudation suppression section.

11. The magnetic recording method according to claim 9, wherein the magnetic recording medium, is configured so that, a width, in a write track width direction, of the writing exudation suppression section in the magnetic recording medium has a distribution, in magnitude, corresponding to a skew angle, which is defined as an inclination angle between a reference direction in the magnetic pole and a tangent line of the write track.

12. A magnetic recording medium configured for a shingle write scheme, comprising a plurality of data recording blocks, each of which is formed with a plurality of write tracks and separated, in a write track width direction, from neighboring one of the data recording blocks with a writing exudation suppression section in between.

* * * * *